Aug. 6, 1957  I. V. BRUMBAUGH  2,801,800
THERMOSTATIC VALVE
Filed July 1, 1955  8 Sheets-Sheet 3

INVENTOR.
ISAAC VERNON BRUMBAUGH
BY
Jerome R. Cox
ATTORNEY

Aug. 6, 1957  I. V. BRUMBAUGH  2,801,800
THERMOSTATIC VALVE

Filed July 1, 1955  8 Sheets-Sheet 4

*INVENTOR.*
ISAAC VERNON BRUMBAUGH
BY
Jerome R. Cox
*ATTORNEY*

Aug. 6, 1957  I. V. BRUMBAUGH  2,801,800
THERMOSTATIC VALVE
Filed July 1, 1955  8 Sheets-Sheet 5
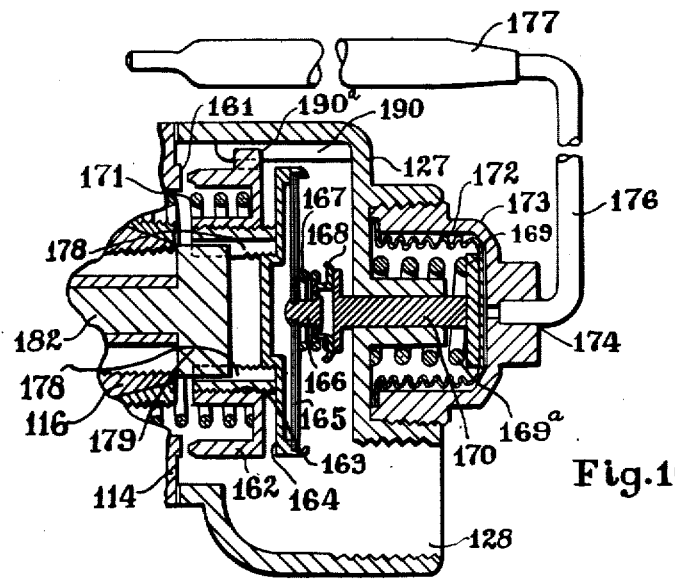
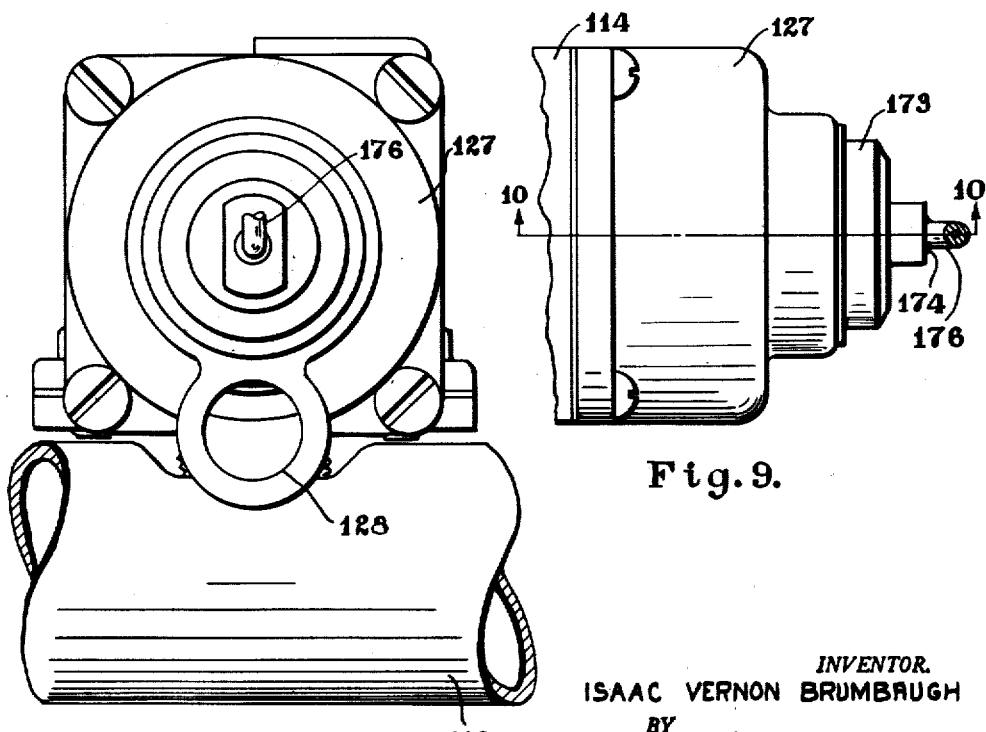
INVENTOR.
ISAAC VERNON BRUMBAUGH
BY
Jerome R. Cox
ATTORNEY Aug. 6, 1957     I. V. BRUMBAUGH     2,801,800
THERMOSTATIC VALVE
Filed July 1, 1955     8 Sheets-Sheet 6
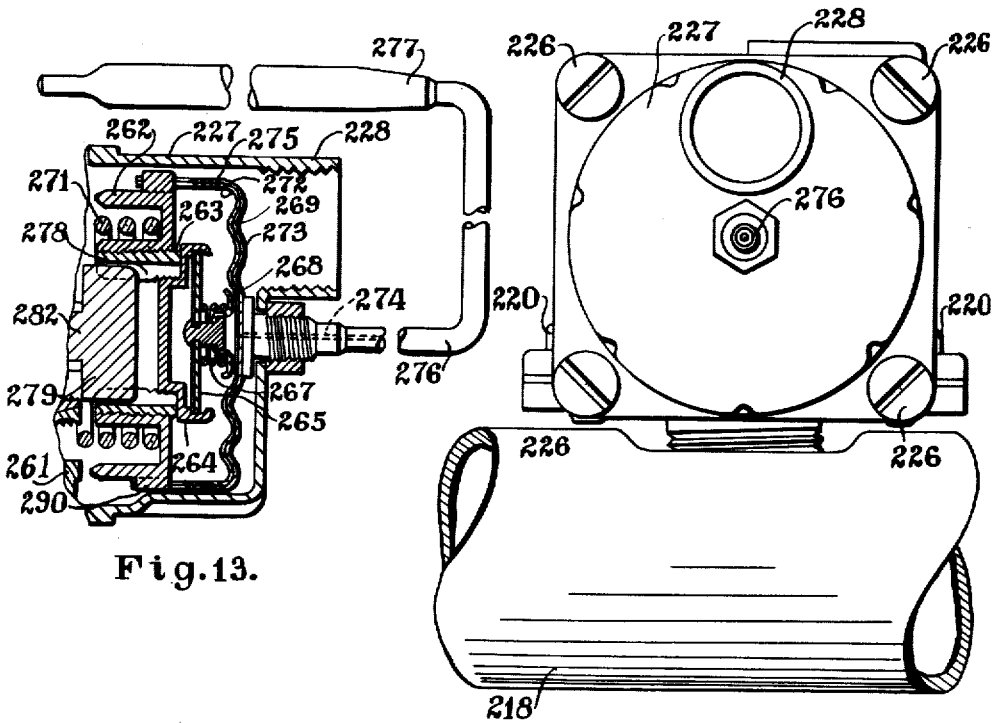
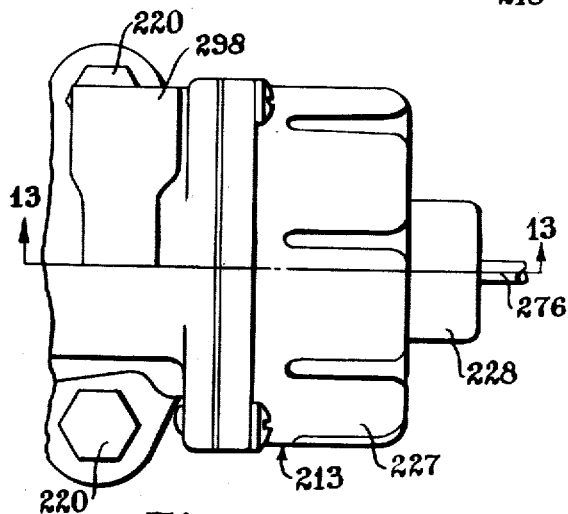
INVENTOR.
ISAAC VERNON BRUMBAUGH
BY
Jerome R. Cox
ATTORNEY INVENTOR.
ISAAC VERNON BRUMBAUGH
BY
Jerome R. Cox
ATTORNEY

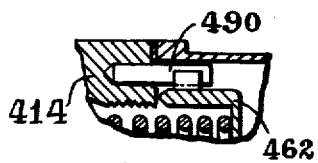
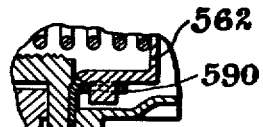
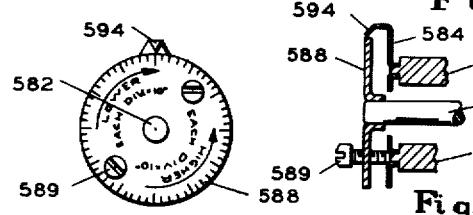
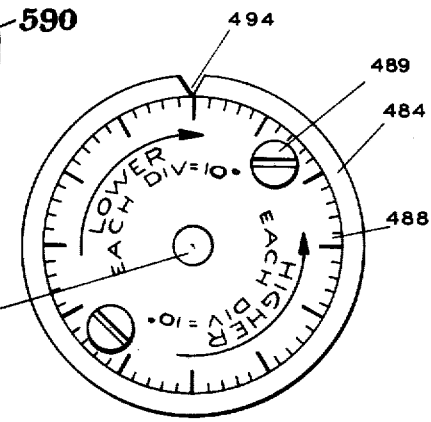
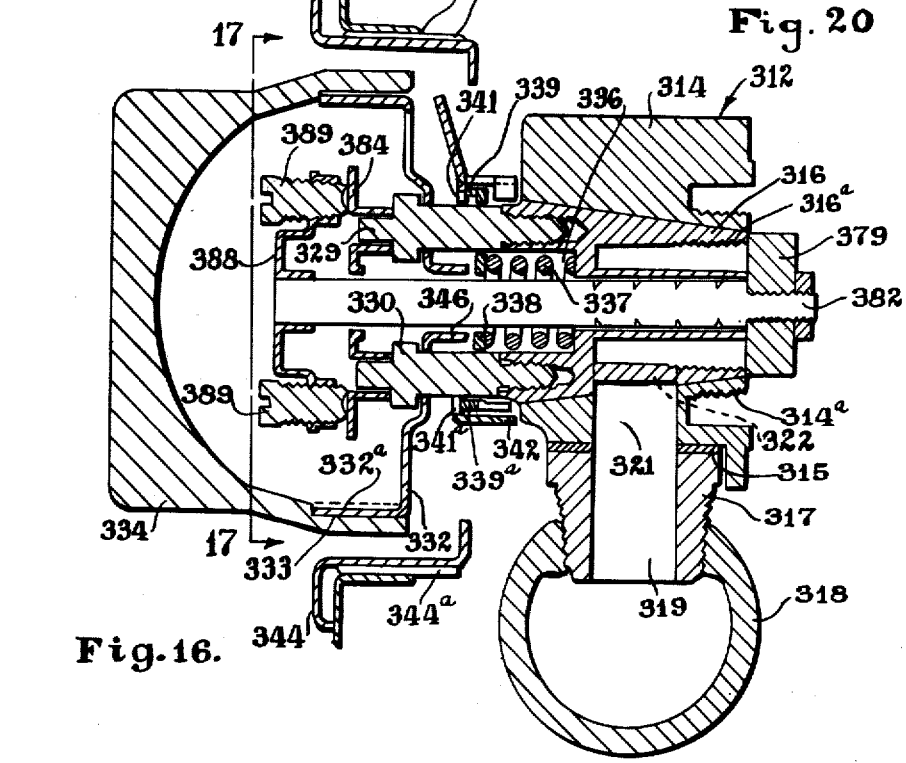

United States Patent Office 2,801,800
Patented Aug. 6, 1957

2,801,800

THERMOSTATIC VALVE

Isaac Vernon Brumbaugh, Clayton, Mo.

Application July 1, 1955, Serial No. 519,428

30 Claims. (Cl. 236—99)

The inventions disclosed in this application relate to valves. The inventions are illustrated by several combined units each including a thermostatic valve and a gas cock valve, the units being especially adapted for use on gas cooking ranges.

The new valves are simple, sturdy, and compact in construction, easy to adjust and operate, and economical to manufacture. They contain all the desirable features of more complicated designs previously used and are more efficient and accurate in some operations than such previous designs.

As suggested above, valves constructed according to this invention may be used for various purposes, but because they offer special advantages in some respects when used as temperature regulators for gas cooking ovens, several embodiments of my invention suitable for such uses will be described in detail.

For the control of a gas cooking oven, it is desirable that there be provided a valve for positively turning the supply of gas on and off in addition to a regulating or oven heat controlled and controlling valve. It is also desirable that the regulating or oven heat controlled valve shall accurately control the supply of gas so that the temperature of the oven may be raised or lowered accurately to any desired temperature and maintained there. It is desirable that arrangements be provided to adjust the relative position of the regulating valve to its seat so that the device will perform accurately. It is desirable that all such adjustments shall not affect the gas cock (i. e. the valve for positively turning the gas on and off). It is desirable that the valve be compensated so that it is not affected by heat external of the oven (which may be termed ambient or impertinent heat just as the oven heat may be considered pertinent heat). It is desirable that provision be made so that gas may bypass the oven heat controlled valve through an adjustable bypass to insure at all times that the gas cock is open with a minimum bead of flame at the oven burner. It is also desirable that provision be made so that an adjustable pilot passage be provided to maintain a pilot flame to ignite the oven burner at any position at which gas flows through the gas cock. It is very desirable that "backlash" be eliminated especially in the adjusting mechanism and in the functioning of the parts of the regulating valve mechanism. The knob for opening and closing the gas cock or shut off valve must be made safe against being turned accidentally when in the "off" position. It is desirable that means be provided to prevent jamming of the regulating valve against its seat, (1) should the oven overheat and especially (2) whenever the temperature control is turned down when the valve is in a regulating position.

I have designed valves which include all of the above desirable and necessary features and are economical to manufacture, efficient in operation and sturdy and simple in construction.

Thus my valves are made of comparatively few parts (many of which are comparatively cheap stampings made by sheet metal presses). My valves in fact have many less parts than valves of previous designs which accomplish similar purposes. My valves are comparatively compact and short and thus when installed on the front of the stove do not extend as far into the compartment as do similar valves and are in fact so compact and short that they may be installed in the narrow space at the back of modern gas ranges between the back rail (or "backsplash") and the wall of the kitchen.

One of the objects of my invention is the provision of a combined gas cock and oven regulator of simple, sturdy and compact construction which is efficient in operation and economical to manufacture.

A further object of my invention is the provision of such a valve which is made up, to a relatively large extent, of stampings so that it is very economical to manufacture.

A further object of my invention is the provision of a combined regulator valve including a gas cock and regulating valve, in which "backlash" is substantially eliminated.

One feature of the construction disclosed is the arrangement by which the escutcheon plate is held in place by being bolted to the spring cap of the gas cock body. Another feature is the cup shaped escutcheon plate which when the valve is installed at the front of the top burner compartment, prevents the hot air from the top burner compartment from flowing around the wheel (knob) and heating it excessively so that my construction prevents burning the fingers of the operator. Another feature is the calibration and graduation of the inner dials to correspond to calibration of the outer dial. A further feature is the construction by which the outer knob or wheel is connected to an inner wheel, the inner wheel is connected to two studs offset from the center of the valve and secured in the plug thus forming a linkage for turning the gas on and off and for operating the regulating valve.

A further feature is the utilization of the studs above referred to as part of the locking means of the adjustment mechanism and, by means of the heads thereof, to limit the movement of the inner wheel which in turn limits the horizontal movement of the outer wheel. A further feature is the provision of a construction which insures that the outer wheel is always put on in its correct position. A further feature of the construction is the provision of two pointers on the inner (adjustment) wheel or knob. A further feature is the provision of the two studs themselves. A further feature is the provision of a compensating diaphragm structure formed of two members one of a high coefficient of thermal expansion and the other of a low coefficient of thermal expansion forming a chamber into which a thermostatic fluid flows and the size of which is adjusted thereby to compensate for impertinent heat which compensating diaphragm structure is utilized to prevent rotation of the valve. A further feature is the provision of a resiliently mounted floating regulating valve combined with means for preventing its rotation. A further feature is the construction by which the regulating valve, the threaded tubular member provided with keyways which is associated therewith, and the takeup spring mechanism may be assembled as a separate unit before being assembled with the main valve body. Further features are the threaded tubular member itself and the combination of the threaded tubular member with a takeup mechanism.

Further features and objects will be apparent from the subjoined specification and claims when considered in connection with the accompanying drawings showing (for purposes of illustration only) several embodiments of my invention.

In the drawings:

Fig. 9 is a fragmentary plan view showing the regulating valve portion of another embodiment of my invention;

Fig. 10 is a fragmentary view in vertical section of a portion of the valve illustrated in Fig. 9 taken substantially as if on the line 10—10 of Fig. 9;

Fig. 11 is a view in end elevation of the valve illustrated in Fig. 9;

Fig. 12 is a fragmentary plan view similar to Fig. 9 showing another embodiment of my invention;

Fig. 13 is a fragmentary view in vertical section of the valve shown in Fig. 12 taken substantially as if on the line 13—13 of Fig. 12;

Fig. 14 is a view in end elevation of the valve of Fig. 12;

Fig. 16 is a view in vertical section of the valve shown in Fig. 15 taken substantially as if on the line 16—16 of Fig. 15 said plane passing through the axis of the valve plug;

Fig. 18 is a fragmentary sectional view illustrating another modification;

Fig. 19 is a fragmentary sectional view illustrating another modification;

Fig. 20 is a fragmentary view in elevation comparable to the sectional view of Fig. 17, but showing a modification with the knob removed and the escutcheon plate, etc. omitted;

Fig. 21 is a view similar to Fig. 20 showing another modification on a smaller scale; and Fig. 22 is a view in vertical section of the modification shown in Fig. 21.

Figure 1:
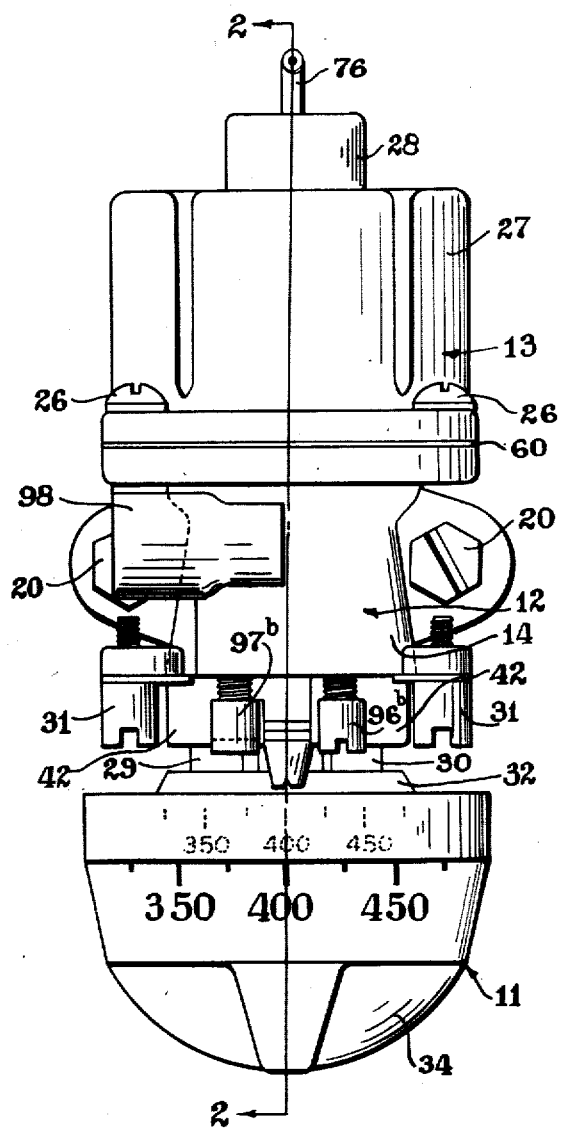
Fig. 1 is a plan view of a valve constituting one embodiment of my invention.
Figure 2:
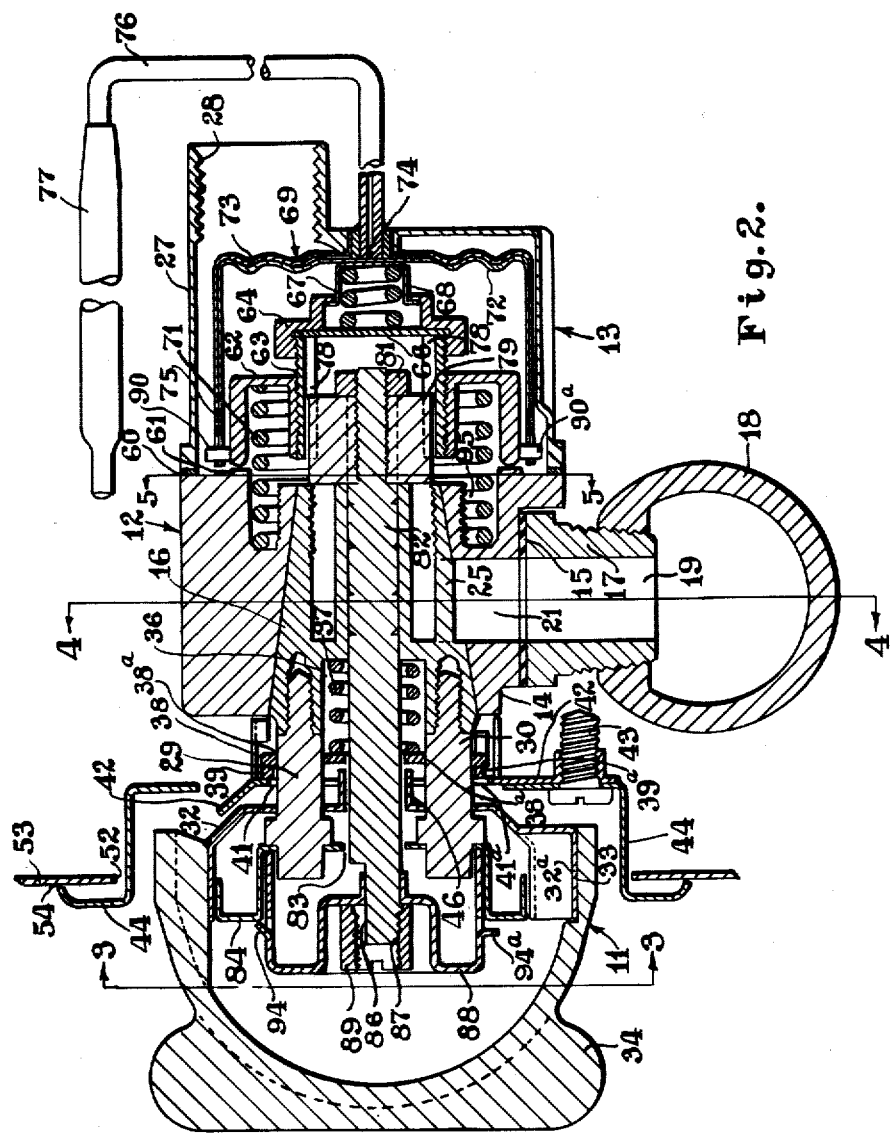
Fig. 2 is a view in vertical section of the valve shown in Figure 1 taken substantially as if on the line 2—2 of Figure 1.
Figure 3:
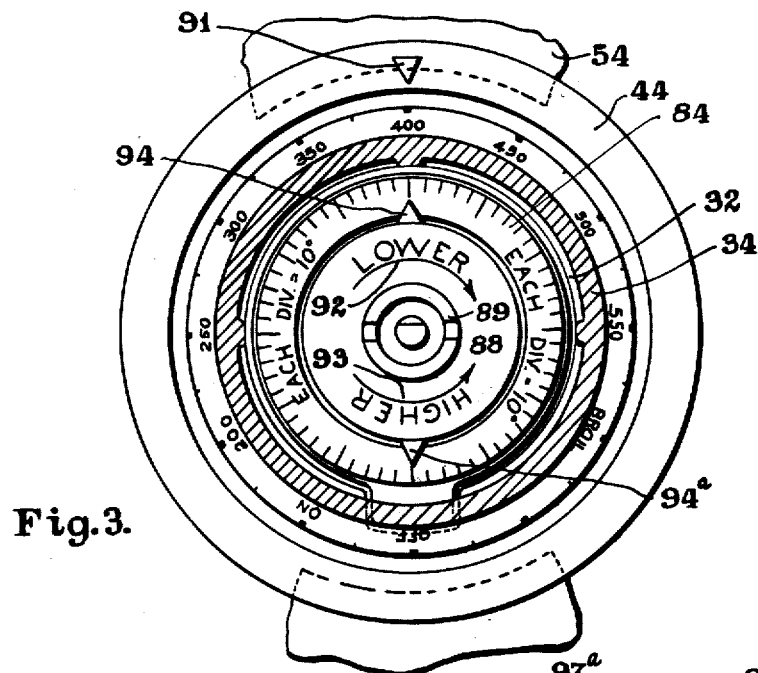
Fig. 3 is a view in vertical section taken substantially as if on the line 3—3 of Figure 2.
Figure 4:
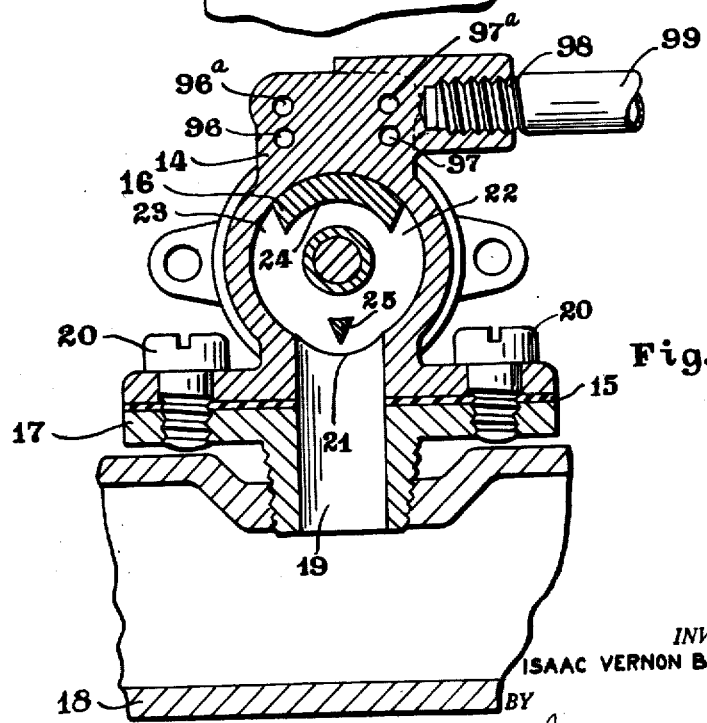
Fig. 4 is a view in vertical section taken substantially as if on the line 4—4 of Figure 2.
Figure 6:
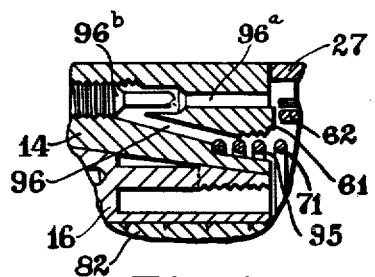
Fig. 6 is a fragmentary view in section taken through the bypass valve.
Figure 7:
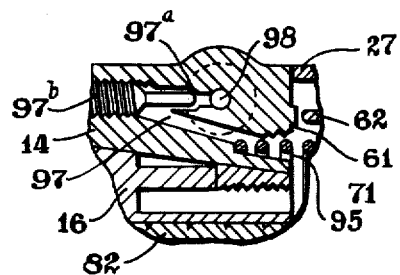
Fig. 7 is a fragmentary view in section taken through the pilot valve.
Figure 8:
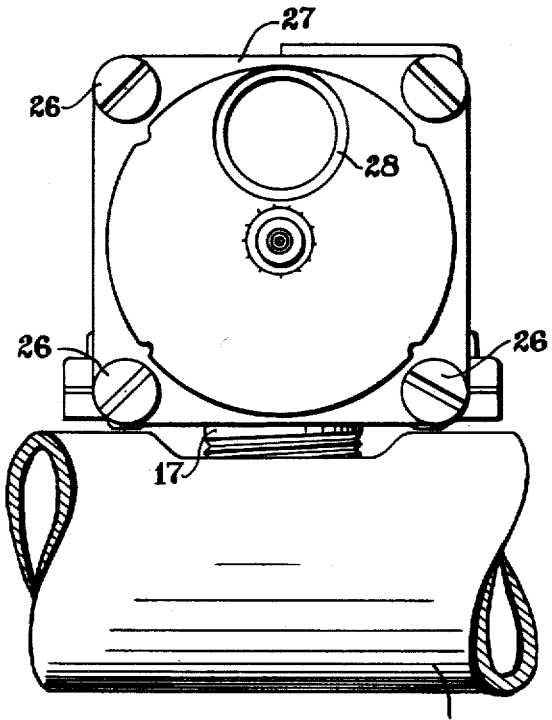
Fig. 8 is a view in end elevation showing the end of my valve opposite to that shown in Figure 3.
Figure 5:
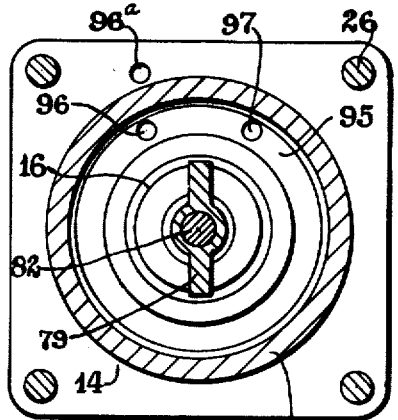
Fig. 5 is a view in vertical section taken substantially as if on the line 5—5 of Figure 2.

For a detailed description of the structures disclosed in illustration of my invention, I refer first to Figures 1–8 inclusive. As may be seen best in Figures 1 and 2, the valve illustrated comprises a knob portion generally designated 11, a central portion generally designated 12 and a regulating valve portion generally designated 13. The central portion 12 comprises a hollow body 14 (see Fig. 2) and tightly fitting therein a tapering plug valve element 16. The body 14 is secured by means of an adaptor 17 to a gas manifold 18 so that fuel gas may be supplied at times to the interior of the plug 16. The adaptor 17 is formed with a passageway 19 which is aligned with a passageway 21 formed in the body 14. The plug 16 (in the portion thereof aligned with the passageways 19 and 21) is formed with ports 22 and 23 (Fig. 4). A solid portion 24 is provided which may be turned to cover the passageway 21 so that fuel gas may not at such times enter from the passageway 21 when the knob is in the "off" position. A smaller solid portion 25 is also provided to strengthen the plug without interfering substantially with the passage of gas. In the position of the valve shown in Figs. 2 and 4 the plug 16 of the main valve is in the open position and fuel gas may flow freely from the manifold 18 into the interior of the plug 16. From the interior of the plug, the fuel gas may flow (Figs. 2 and 5) into the interior of the casing 27 which forms a cover for the regulating valve portion 13. The casing 27 is provided with a threaded outlet opening 28 to which there are secured connections leading to the cooking gas burner in the associated oven.

I provide means by which the plug 16 may be rotated to open and close the passages therethrough, by which fuel gas flows from the manifold 18 to the interior of the plug. Screwed into the rear end of the plug 16 are a pair of studs 29 and 30. These studs 29 and 30 are also inserted through openings formed in a stud control stamping 32 which has a portion 32a formed outwardly from the periphery of the plug 16 so as to be eccentric of the axis of the plug 16, the portion 32a being held within an eccentric groove 33 formed on the inside of a calibrated control knob or wheel 34. Thus the knob 34 is so designed that its rotation rotates the stamping 32 and thus turns the studs 29 and 30 and the plug 16 about the axis of the latter.

I provide means to prevent accidental rotation of the plug 16. Within a recess 36 formed in the plug 16 is a compression spring 37 which bears at its outer end on a stop washer 38 and urges the washer outward. Formed on the washer 38 are a pair of different sized ears or stops 39 and 39a which are thus urged by the spring 37 into corresponding notches 41 and 41a formed in a cap 42. One of the ears and the corresponding notch is long and narrow, and the other ear and corresponding notch is short and thick. The cap 42 is secured as by one or more screws such as 43, to an escutcheon plate 44 and by one or more screws such as screws 31 (Fig. 1) to the body 14 and is thus prevented from rotating with the plug 16, a central opening being provided in which the studs 29 and 30 may turn. The stop washer 38, however, is formed with a pair of smaller openings 38a through which the studs 29 and 30 extend and thus must turn with the plug 16. Thus so long as the ears 39 and 39a are in the notches 41 and 41a, the plug 16 may not be rotated. The stamping 32 has an inwardly extending concentric flange 46 which is arranged to contact the washer 38 and arranged when the knob 34 is pressed inward to move the washer 38 inward compressing the spring 37 and removing the stops 39 and 39a from the notches 41 and 41a. Thus by pressing inward on the knob 34, it together with the stamping 32, the studs 29 and 30, and the plug 16 may be rotated for the purpose of opening the passages 22 and 23 from the manifold 18 to the interior of the plug 16. The escutcheon plate 44 extends through an opening 52 formed in plate 53 of the range and (as may be seen at 54) overlays a portion of the plate 53.

I provide means for controlling the amount of gas which may flow from the interior of the plug 16 to the oven by way of the casing 27 and the outlet 28. On the end of the body 14 opposite to the knob portion 11 there is formed an annular valve seat 61. Adapted to seat thereon is an annular cup shaped movable valve element 62 which is screwed onto a sleeve 63. Also threaded on the sleeve 63 is a cap 64 which secures between it and the sleeve 63 a circular metal washer 66. Bearing on the washer 66 is a relatively strong take-up spring 67 which at its opposite end, bears on a take-up spring cap or cup 68. The flanged cup 68 is inserted in the end of the cap 64. The spring cup 68 bears at its opposite side on a compensating diaphragm unit 69 which will later be described more in detail. The diaphragm unit 69 controls the position of the valve element 62. For this purpose, movement of the diaphragm unit 69 to the left (Fig. 2) acts through the spring cup 68, the spring 67, the washer 66 and the sleeve 63 to move the valve element 62 towards its seat 61. The valve element 62 is continuously urged from its seat by a spring 71 which, however, is not as strong as spring 67.

Assuming that the valve element 62 is (as shown) threadedly secured to the sleeve 63, the movement of the valve element 62 towards its seat 61 is controlled solely and accurately by the diaphragm unit 69 which, as will be explained, is controlled by the temperature in the oven. An automatic compensation is provided which forms a part of the diaphragm unit 69 to compensate for impertinent heat so that the movement of the diaphragm unit 69 governing the valve member 62 depends entirely on the temperature in the oven. The diaphragm unit 69 is composed of an inner diaphragm member 72 having a relatively low coefficient of thermal expansion and an outer diaphragm member 73 having a relatively high coefficient of thermal expansion the two diaphragms being welded to each other as at 75. Between the two diaphragms there is formed at times a pocket or recess into which a heat responsive liquid may expand. This pocket is connected as at 74 to a capillary tube 76 which extends to the oven and is there connected to a bulb 77 located wholly in the oven. This tube 76 and bulb 77 are filled with the heat responsive liquid which has a relatively high coefficient of thermal expansion. As the oven is heated the liquid in the bulb 77 is heated and expands forcing liquid through the capillary tube and into the pocket or space between the diaphragms 72 and 73. The diaphragms are thus forced apart. The movement of the diaphragm 72 is imparted to the cup 68, the spring 67, the washer 66, and the sleeve 63 so as to move the valve element 62 towards its seat 61. This movement of the valve element 62 throttles the supply of gas to that required to maintain a temperature in the oven which will correspond to that for which the controls may be set. Should the interior of the casing 27 be heated (as for example by the top cooking burners of the range or oven by heat emanating from the oven or a broiler) this impertinent heat would tend to expand the liquid in the recess or pocket between the diaphragms 72 and 73 so that the valve element 62 might be moved toward its seat in response to the impertinent heat and not be solely dependent on the pertinent heat in the oven. However, the diaphragms 72 and 73 compensate for this. Such impertinent heat will cause an expansion of the diaphragm 73 to a greater extent than the expansion of the diaphragm 72 thus enlarging the pocket between them, which enlargement corresponds to the expansion of the liquid in the pocket caused by the impertinent heat.

I provide means to adjust the linkage by which the valve element 62 is connected to the diaphragm unit 69 so that the regulator may be pre-set to maintain the oven at any predetermined desired temperature. The interior of the sleeve 63 is formed with a keyway 78. Positioned in this keyway 78 is a key 79 which may be secured as by a nut 81 on the end of a shaft 82. The shaft 82 passes concentrically through the axis of the plug 16. The shaft 82 at the end opposite to the nut 81 passes through the spring 37, the washer 38, the spring cap 42 and the stud control stamping 32. Beyond the stamping 32, it passes through an opening 83, in a graduated wheel stamping or inner dial or disc 84 which is set within the rim of the stud control stamping 32. Beyond the stamping 84 the shaft 82 has a flat portion as at 86 and at its extreme end is threaded as at 87. Closely fitted onto the flat portion 86 of the shaft 82 is a knob stamping or outer dial or disc 88 which is smaller than the disc 84 and by means of which the shaft 82 may be rotated relative to the plug 16. However, a nut 89 may be screwed down on the threaded portion 87 to the position shown thus forcing the outer disc stamping 88 into contact with the inner disc support stamping 84 and with the studs 29 and 30 and rigidly locking these parts and the plug 16 against relative movement. Thus normally the nut 89 is in the position shown and these parts are locked against relative movement. Rotation of the knob 34 not only rotates the stud control stamping 32, the studs 29 and 30 and the plug 16, but also rotates the wheel stamping 84, the knob stamping 88, the shaft 82, the key 79 and the sleeve 63. The valve element 62 has ears such as 90 and 90a which extend through notches formed in the diaphragm unit 69 and is thus prevented from rotating. The relative rotation of the sleeve 63 relative to the valve element 62 by the shaft 82 lengthens or shortens the connection between the spring cup 68 and the valve element 62 and moves the valve element 62 nearer to or farther away from its seat 61, assuming that the recess or pocket in the diaphragm remains empty or filled to a constant extent by thermostatic liquid. Thus as will be more fully described hereafter, the valve element 62 may be pre-set by the knob 34 to maintain any desired temperature in the oven.

Referring now to Figure 3, it may be seen that the knob 34 is provided with indicia "off," "on," "200," "250," "300," "350," "400," "450," "500," "550" and "broil" which forms a calibrated dial. The escutcheon plate 44 is provided with a pointer 91. Rotation of the knob 34 causes the various indicia of the scale to register with the pointer 91 to inform the operator of the temperature which corresponds to the "then" setting of the valve member 62. As is indicated in dotted lines in Fig. 1, the stud control stamping 32 is similarly marked with a calibrated scale so that even with the knob removed, it is possible to determine the indicated setting of the valve element 62. The outer dial stamping 88 is provided with an arrow 92 pointing clockwise designated "lower" and an arrow 93 pointing counterclockwise designated "higher." It is also formed with a pair of turned out portions 94 and 94a which form pointers and cooperate with a graduated scale provided on the wheel stamping 84. The scale on the wheel stamping or inner dial 84 does not carry numbers indicating the corresponding temperatures in the oven and extends completely around the stamping but corresponds to the scales on the knob 34 and on the stud control stamping 32. The purpose of all these markings will be explained more fully in the explanation of the operation of my combined gas cock and regulating valve.

I provide means to maintain flames in the oven whenever the knob 34 is turned to the "on" position or higher. Fuel gas flowing into the interior of the plug 16 may flow around the key 79 (see Figs. 2 and 5) into the interior of the cup shaped valve element 62 and also into an annular pocket 95 formed in the body 14. When the plug valve is open and the valve element 62 is moved away from its seat, fuel gas flows between the valve element 62 and its seat and into the casing 27 and through the outlet 28 to the main burner. Whether the valve element 62 is seated or not, fuel gas also flows from pocket 95 (Fig. 6) through bypass passages 96 and 96a (which are controlled by an adjustment screw 96b) to the interior of the casing 27 and to the outlet 28 to maintain a bead of flame on the burner in the oven. It also flows from pocket 95 through pilot passages 97 and 97a (Fig. 7) controlled by an adjustment screw 97b and thence through outlet 98 and pilot tube 99 to the oven to maintain a pilot flame therein.

It may be especially noted that the annular pocket or recess 95 provides a space and seat for spring 71 and a passage connecting the gas supply to bypass passage 96 and to pilot passage 97.

Screws 20, 26, and 31 (all shown in Fig. 1) and washers 15 (Fig. 2) and 60 (Fig. 1) are provided for securing the adaptor 17 to the body 14, the casing 27 to the body 14; and the cap 42 to the body 14 and for sealing the joints between the body 14 and the adaptor 17 and between the body 14 and the casing 27 respectively.

The operation of this embodiment of my invention is as follows: Assuming that all adjustments are made and the valve is in the "off" position, the operator wishing to heat the oven pushes in on the knob 34 to release the lock formed by the stops 39 and notches 41 and turns the knob 34 counter-clockwise from the "off" position to the "on" position and then lights the burner and/or the pilot flame in the oven. He then turns the knob 34 to the degree of temperature desired. For example, he may set the calibration on the knob at 400° as shown. This opens the plug valve 16 and because of the threaded connection between the sleeve 63 and the valve element 62, and the rotation of the sleeve 63 by the key 79 secured to the end of the shaft 82, moves the valve element 62 away from its seat. The fuel gas flows from the manifold 18 through the passages 19, and 21, the interior of the plug valve, passages 96, 96a, 97 and 97a, tube 99, under the valve element 62, through casing 27 and outlet 28 to the oven. As the oven heats, the thermostatic liquid expands in the bulb 77 and through the tube 76 to the pocket between the diaphragms 72 and 73 of the unit 69. The expansion of the unit 69 moves the spring cup 68 and through the spring 67, the washer 66, and the sleeve 78, moves the valve element 62 towards its seat compressing the spring 71, because the spring 67 is stronger than the spring 71. After the valve 62 seats, further expansion of the unit 69 compresses the spring 67 without injury to any parts. However, this normally does not occur for the reason that the thermostat unit 69 is so sensitive that it moves the valve element 62 merely so close to its seat that just a sufficient amount of gas flows through the valve and through the bypass passage to maintain the oven at exactly the desired temperature without ever entirely closing the regulating valve while a cooking temperature is being maintained. Any heat exterior of the oven affecting the thermostatic liquid also expands the diaphragm 73 increasing the size of the recess between the diaphragms and compensating for such impertinent heat. When the cooking is completed, the operator turns the knob 34 in a clockwise direction to the "off" position. This closes the valve 16 and shuts off the supply of gas to the oven. During cooking, if desired, the operator may raise or lower the heat in the oven by turning the knob 34 in either a counterclockwise or clockwise direction. Whether in turning the oven off, or in turning the knob 34 in a clockwise direction to lower the oven heat, it is obvious that the valve element 62 will be moved further toward the seat 61. Assuming that the thermostatic unit 69 has started to move the element towards its seat, such added movement of the element 62 by means of the knob 34 will usually seat the valve and then further rotation of the knob 34 will cause the sleeve 63 to move to the right (as shown in Fig. 2) compressing the spring 67 without injury to any parts of the device.

In the factory before the knob 34 is installed on the regulator, the calibrations may be adjusted to conform to oven temperatures. To accomplish this, the stud control stamping 32 may be turned so that the calibration thereon indicates a setting of 400°. The valve may be installed on a range, and the oven burners lighted. Then the nut 89 is loosened and the knob stamping 88 is slightly withdrawn. A thermometer in the oven registers the accurate temperature therein. If it does not agree with the setting of the indicia on the stamping 32, the inner knob stamping 88 is turned clockwise to lower the temperature as indicated by the arrow 92 or counterclockwise to increase the temperature as indicated by the arrow 93 at the same time that the inner knob 84 is held against movement. Thus the temperature of the oven is raised or lowered to correspond to that of the setting of the stud control stamping 32. The 10° markings on the graduated stamping 84 aid the person making this adjustment. If desired, this adjustment may be made in the factory by the use of a heated oil bath as is known in the art.

In Figures 9, 10 and 11, I show another embodiment of my invention. It is to be understood, of course, that the portion of the valve here illustrated is associated with portions of a valve similar to the portions shown in the central portion and left hand end of Fig. 2. Also that in describing the valve of Figs. 9, 10 and 11, numerals similar to those used in Figs. 1–8 with the addition of 100 will usually be used to designate the same parts or to designate parts performing similar functions. Thus there is provided a plug 116, a casing 127 and an outlet 128. Adapted to seat on the valve seat 161 is a cup shaped movable valve element 162 which is screwed onto a sleeve 163. Also threaded in the sleeve 163 is a cap 164 which has secured thereto a bi-metallic member 165 serving as a compensating thermostat to compensate for impertinent heat. Bearing on the thermostatic member 165 is a relatively strong take-up spring 167 which at its opposite end bears on a take-up spring cap 168. The cap 168 is secured by means of a stud 166 to a member 165. The spring cap 168 bears at its opposite side on a rod 170 which in turn bears on a plate 169. The position of the plate 169 is controlled by a flexible bellows 172 positioned in a casing 173. The bellows 172 controls the position of the valve element 162. For this purpose, movement of the bellows 172 to the left (Fig. 10) acts through the rod 170, the spring cap 168, the spring 167, the member 165, the cap 164 and the sleeve 163 to move the valve element 162 toward its seat 161. The valve element 162 is continuously urged from its seat 161 by a spring 171 which however is not as strong as spring 167.

Assuming that the valve element 162 is (as shown) secured to the sleeve 163, the movement of the valve element 162 towards its seat 161 is controlled by the bellows unit 172 which as will be explained is controlled by the temperature in the oven. I provide an automatic compensation to compensate for impertinent heat so that the movement of the diaphragm 172 governing the valve member 162 depends entirely on the temperature in the oven. The thermostat 165 is composed of two layers of metal integrally joined together, the layer towards the right having a relatively low coefficient of thermal expansion and the layer towards the left having a relatively high coefficient of thermal expansion. This member thus bows to the left (Fig. 10) in response to impertinent or ambient heat and thus compensates for it.

Between the diaphragm 172 and the casing 173 there is formed at times a pocket or recess into which a heat responsive liquid may flow. This pocket is connected as at 174 to a capillary tube 176 which extends to the oven and is there connected to a bulb 177 located in the oven. This tube 176 and bulb 177 are filled with a heat responsive liquid which has a relatively high coefficient of thermal expansion. As the oven is heated, the liquid in the bulb 177 is heated and expands liquid through the capillary tube and into the pocket or space between the bellows 172 and the casing 173. The bellows is thus forced inwardly. The movement of the bellows 172 is imparted to the plate 169, shaft 170, the cap 168, the spring 167, the stud 166, the member 165, the cap 164 and the sleeve 163 so as to move the valve element 162 towards its seat 161. This movement of the valve element 162 throttles the supply of gas to that required to maintain a temperature in the oven which will correspond to that for which the controls may be set. Should the interior of the casing 127 be heated (as for example by the top cooking burners of the range) this impertinent heat would tend to expand the liquid in the recess or pocket between the bellows 172 and the casing 173 so that the valve element 162 might be moved toward its seat in response to the impertinent heat and not be solely dependent on the pertinent heat in the oven. However, the thermostat member 165 compensates for this. Such impertinent heat will cause a bowing of the member 165 to compensate for the expansion of the liquid in the pocket.

I provide means in this embodiment also to adjust the linkage by which the valve element 162 is connected to the diaphragm unit 172 so that the regulator may be preset to maintain the oven at any predetermined desired temperature. The interior of the sleeve 163 is formed with a keyway 178. Positioned in this keyway 178 is a key 179 which may be formed integrally on the end of a shaft 182. The shaft 182 corresponds otherwise to the shaft 82 and all the other parts of the valve to the left of the parts shown correspond to the parts of the valve of Figures 1–8 inclusive.

The casing 127 is formed with an ear 190 which extends into a keyway formed between a pair of projections on the valve element 162, one of which is shown at 190a and the valve 162 is thus prevented from rotating. The rotation of the sleeve 163 relative to the valve element 162 lengthens or shortens the connection between the plate 169 and the valve element 162 and moves the valve element nearer to or farther away from its seat assuming that the recess or pocket between the bellows 172 and the casing 173 remains empty or filled to a constant extent by thermostatic liquid. Thus as has been described above in connection with valve element 62, the valve element 162 may be pre-set by the controlling knob to maintain any desired temperature in the oven. A very strong spring 169a bears on plate 169 and maintains pressure at all times on the liquid in the tube 176 and in the bulb 177.

Fuel gas is supplied from manifold 118 to the interior of plug 116 and thence past the valve 162 to the casing 127. The thermostat 165 compensates for impertinent heat. Otherwise the operation of this embodiment of my invention is so similar to that described above in connection with the embodiment shown in Figures 1–8 inclusive that further description is unnecessary.

In Figures 12, 13 and 14 I show another embodiment of my invention.

Therein gas may flow to the oven by way of the casing 227 and the outlet 228. An annular cup shaped movable valve element 262 which is screwed into a sleeve 263 is adapted to seat on an annular valve seat 261. Bearing on the member 265 is a relatively strong take-up spring 267 which at its opposite end bears on a spring cap 268. The spring cap 268 bears at its opposite side on a diaphragm unit 269 which will later be described more in detail. The diaphragm unit 269 controls the position of the valve element 262. For this purpose, movement of the diaphragm unit 269 to the left (Fig. 13) acts through the spring cap 268, the spring 267, the element 265, the cap 264, and the sleeve 263 to move the valve element 262 towards its seat 261. The valve element 262 is continuously urged from its seat by a spring 271 which however, is not as strong as spring 267.

Assuming that the valve element 262 is (as shown) secured to the sleeve 263, the movement of the valve element 262 towards its seat 261 is controlled solely and accurately by the diaphragm unit 269 which is, as will be explained, controlled by the temperature in the oven. I provide automatic compensation by means of the element 265 (operating in the same way as 165) to compensate for impertinent heat so that the movement of the diaphragm unit 269 governing the valve member 262 depends entirely on the temperature in the oven. The diaphragm unit 269 is composed of an inner diaphragm member 272 and an outer diaphragm member 263 having their edges welded together as at 275. Between the two diaphragms there is formed at times a pocket or recess into which a heat responsive liquid may flow. This pocket is connected as at 274 to a capillary tube 276 which extends to the oven and is there connected to a bulb 277 located wholly in the oven. This tube 276 and bulb 277 are filled with the heat responsive liquid which has a relatively high coefficient of thermal expansion. As the oven is heated the liquid in the bulb 277 is heated and expands forcing liquid to flow through the capillary tube and into the pocket or space between the diaphragms 272 and 273. The diaphragms are thus forced apart. The movement of the diaphragm 272 is imparted to the cap 268, the spring 267, the element 265, the cap 264 and the sleeve 263 so as to move the valve element 262 towards its seat 261. This movement of the valve element 262 throttles the supply of gas to that required to maintain a temperature in the oven which will correspond to that for which the controls may be set. Should the interior of the casing 27 be heated by impertinent heat, the effect thereof is offset by the thermostat 265.

I provide means to adjust the linkage by which the valve element 262 is connected to the diaphragm unit 269 so that the regulator may be pre-set to maintain the oven at any predetermined desired temperature. The interior of the sleeve 263 is formed with a keyway 278. Positioned in this keyway 278 is a key 279 which may be formed integrally on the end of a shaft 282. The shaft 282 corresponds otherwise to the shaft 82 and all of the other parts of the valve to the left of the portions shown correspond to the parts of the valve of Figures 1–8 inclusive. The valve element 262 has ears such as 290 which extend through slots formed in the diaphragm unit 269 and is thus prevented from rotating. The relative rotation of the sleeve 263 relative to the valve element 262 lengthens or shortens the connection between the cap 268 and the valve element 262 and moves the valve element nearer to or farther away from its seat assuming that the recess or pocket in the diaphragm remains empty or filled to a constant extent by thermostatic liquid. Thus as has already been fully described above in connection with the embodiment shown in Figures 1–8 inclusive, the valve element 262 may be pre-set by the controlling knob to maintain any desired temperature in the oven.

Fuel gas is supplied from the manifold 218 to the interior of plug 216 and thence past the valve 162 to the casing 127. The thermostat 265 compensates for impertinent heat. Otherwise the operation of this embodiment is so similar to that described above in connection with the embodiment shown in Figures 1–8 inclusive that further description is unnecessary.

Figure 17:
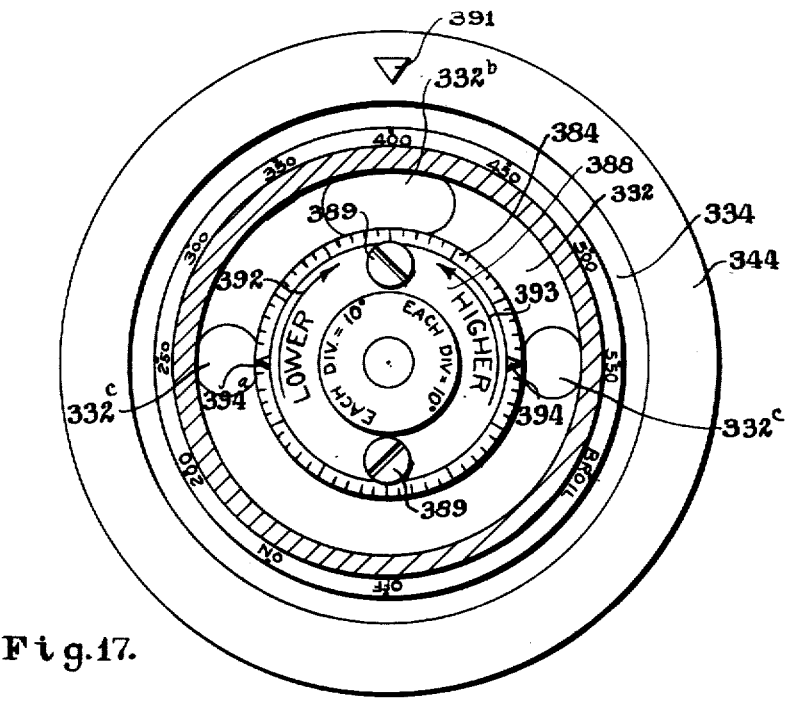
Fig. 17 is a view in vertical section of the valve of Fig. 15 taken substantially as if on the line of 17—17 of Fig. 16.
Figure 15:
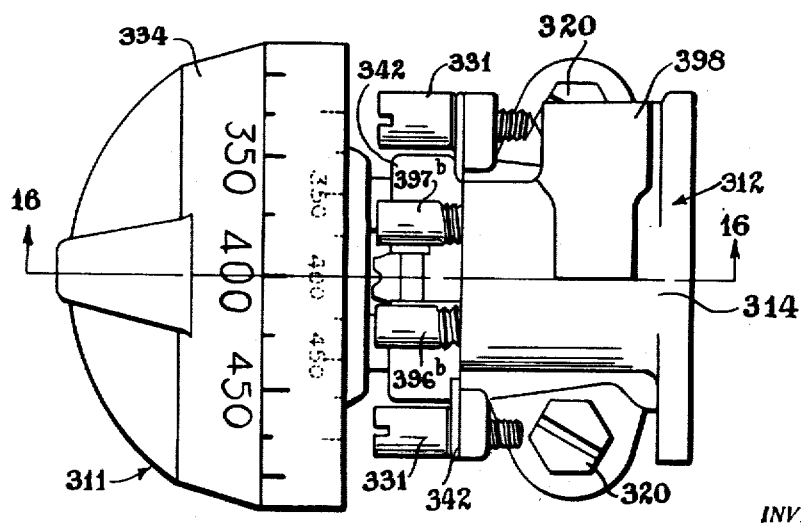
Fig. 15 is a plan view showing a portion of another embodiment of my invention.

In Figures 15–17 inclusive, I show a modification of the left hand portion (knob portion) and the central portion. Therein is shown a knob portion 311 and a central portion 312. The body portion 312 comprises a hollow body 314 (see Fig. 16) and fitting therein a plug valve element 316. The body 314 is secured by means of an adaptor 317 to a gas manifold 318 so that fuel gas may be supplied at times to the interior of the plug valve 316. The adaptor 317 is formed with a passageway 319 which is aligned with a passageway 321 formed in the body 314. The plug valve 316 (in the portion thereof aligned with the passageways 319 and 321) is formed with ports such as 322 (Fig. 16). In the position of the valve shown in Figure 16 the plug valve 316 is open and fuel gas may flow freely from the manifold 318 into the interior of the plug valve 316. From the interior of the plug valve, the fuel gas may flow into the interior of an associated casing having a regulating valve and thence into connections leading to the cooking gas burner in the associated oven. The plug valve 316 is provided with threads as at 316a so that a chuck may be attached and the tapered external surface of the plug may be accurately machined. Similarly the body 314 is provided with threads 314a so that a chuck may be attached and the complementary tapered surface of the body in which the tapered surface of the plug seats, may also be accurately machined.

I provide means by which the plug valve 316 may be rotated to open and close the passages therethrough by which fuel gas flows from the manifold 318 to the interior of the plug valve. Screwed into the rear end of the plug valve 316 are a pair of studs 329 and 330. These studs 329 and 330 are also inserted through openings formed in a stamping 332 which has a portion 332a bent out from the periphery so as to be eccentric of the axis of the plug valve 316, the portion 332a being held within an eccentric groove 333 formed on the inside of a control knob 334. Thus the knob 334 is so designed that its rotation rotates the stamping 332 and thus turns the studs 329 and 330 and the plug 316 about the axis of the latter.

I provide means to prevent accidental rotation of the plug 316. Within a recess 336 formed in the plug 316 is a compression spring 337 which bears at its outer end on a stop washer 338 and urges the washer outward. Formed on the washer 338 are a pair of stops 339 and 339a which are thus urged by the spring into notches 341 and 341a formed in a spring cap 342. The spring cap 342 is secured by one or more screws such as screws 331 (Fig. 15) to the body 314 and is thus prevented from rotating with the plug 316. The stop washer 338 however, is formed with separate openings through which the studs 329 and 330 extend and thus must turn with the plug 316. Thus so long as the ears 339 and 339a are in the notches 341 and 341a, the plug 316 may not be rotated. The stamping 332 has an inwardly extending concentric flange 346 which is arranged to contact the washer 338 and arranged when the knob 334 is pressed inward to move the washer 338 inward compressing the spring 337 and removing the stops 339 and 339a from the notches 341 and 341a. Thus by pressing inward on the knob 334, it together with the stamping 332, the studs 329 and 330 and the plug 316 may be rotated for the purpose of opening the passages from the manifold to the interior of the plug valve. The escutcheon plate 344 extends through a flanged opening 352 formed in plate 353 of the range and (as may be seen at 354) overlays a portion of the plate 353. It is held to the plate 353 by friction (springy) projections 344a.

I provide means similar to one of the constructions shown in Figures 1–14 inclusive for controlling the amount of gas which may flow from the interior of the plug 16 to the oven. This regulating means may be preset to maintain the oven at any desired predetermined temperature in a similar manner, there being provided a key 379 serving the same purpose as keys 79, 179 and 279 depending on the type of regulating valve which I may associate therewith. The key 379 is secured to a shaft 382 which has soldered or otherwise secured to the front or outer end thereof a knob stamping or outer dial 388 by means of which the shaft 382 may be rotated relative to the plug 316. The stamping 388 is formed with a pair of "off center" or eccentric threaded openings into which are threaded screws 389. Normally these screws 389 bear on a wheel stamping or inner dial 384 which engages, as shown, the heads of the studs 329 and 330. Thus normally the knob stamping 388 may not be rotated relative to the stamping 384, relative to the studs 329 and 330, or relative to the plug 316. To adjust the regulating valve the screws 389 are loosened and then the knob stamping or outer dial 388 may be rotated relative to the inner dial stamping 384 to adjust the regulating valve. Normally however, rotation of the knob 334 not only rotates the stud control stamping 332, the studs 329 and 330 and the plug 316, but also the wheel stamping 384, the knob stamping 388, the shaft 382 and the key 379 to move the regulating valve. The knob 334 is provided with calibrated indicia similar to that provided on the knob 34 which indicia is associated with a pointer 391. The stud control stamping 332 is also provided with a corresponding calibrated scale. The outer dial stamping 388 is provided with arrows 392 and 393 and with pointers 394 and 394a cooperating with the graduated scale on the wheel stamping 384. The purpose of all these markings has been explained fully in the previous explanation of the operation of my combined gas cock and oven heat regulator.

Bypass passages are controlled by an adjustment screw 396b and maintain a bead of flame on the burner in the oven, and pilot passages are controlled by an adjustment screw 397b to maintain a pilot flame therein.

Screws 320 and 331 and washers 315 are provided for securing the adaptor 317 to the body 314, and the cap 342 to the body 314 and for sealing the joint between the body 314 and the adaptor 317.

The operation of this embodiment of my invention is so similar to that described above in connection with other embodiments that little further need be added. In adjusting the regulating valve in the factory or elsewhere the screws 389 are loosened and the dial stamping 388 is rotated relative to the wheel stamping 384. A large opening 332b is provided in the stud control stamping 332 for adjusting the adjustment screws 396b and 397b and two smaller openings 332c are provided therein for inserting cap screws 331.

In Fig. 18 another method of preventing rotation of the valve member is disclosed. Therein two or more pins such as 490 secured in the body 414, prevent the valve 462 from rotating. In Fig. 19 still another method is disclosed. Ears 590 formed on the gasket 560 prevent the valve 562 from rotating.

This application is in part a continuation of my co-pending application Serial No. 764,757, filed July 30, 1947, now abandoned.

One feature of my invention disclosed above, not heretofore emphasized is the method by which I lock or anchor my adjusting mechanism through the stem on both ends of the plug. Heretofore it has been usual to provide a complicated structure including a collar secured to the outer end of the valve stem, and a flanged sleeve cooperating with the collar and held in place by a cooperating cover. However, I tightly clamp the two relatively movable indexed parts or disk-like members (e. g. the knob stamping 88 and the inner knob or wheel stamping 84) against each other by forcing (sliding action) the stamping 88 inward along the outer end of the stem 82 when nut 89 is tightened and providing an abutting element (key 79) secured to the inner end of the stem by nut 81 and abutting against the inner end of the plug 16, and arranging the other indexing part (knob 84) so that it in effect is pushed outward by the outer end of the plug 16. I thus arrange the parts so that while the stamping 88 pushes inward on the stamping 84, the stamping 88 in effect pushes outward on the plug 16 and the stamping 84 in effect pushes inward on the plug 16. Thus the two stampings oppose each other and thus are tightly and strongly urged against each other. The manner in which the stamping 88 pushes outward on the plug 16 is as follows: The stamping 88 is free to slide but is secured to the outer end of the stem 82 by the nut 89 by which it may be tightened as much as may be desired. The inner end of the stem 82 has the nut 81 which bears outwardly on the key 79 and thus the stem 82 itself is urged inwardly by the inner end of the plug 16. Thus the stamping 88 urges the plug 16 outwardly. In turn, stamping 88 urges the stamping 84 inwardly against the abutting members or studs 29 and 30 which urge the plug 16 inwardly. In other words, tightening of the nut 89 in effect clamps together as a rigid unit the stamping or disk-like member 88, the stamping or disk-like member 84, the abutting members or studs 29 and 30, the plug 16, the key 79, the nut 81 and the stem 82 to which the nut 89 is fastened. This causes the stem 82 to be in tension between the adjustment locking nut 89 and the key 79. Thus the two adjustment stampings or disk-like members 88 and 84 are clamped to the plug 16 and they are clamped between locking nut 89 and the key 79.

A similar construction which I in fact prefer is shown in Fig. 16 where tightening of the adjustment dial screws 389 urges the inner disk-like member or dial 384 inward thus urging the plug 316 inward through the abutting members or studs 329 and 330. The plug 316 urges an abutment member (consisting of the key 379 and the retaining nut therefor) inward and this in turn pulls the stem 382 inward forcing the outer disk-like member or dial 388 with the screws 389 inward and clamping the plug 316 in effect between the adjustment dials 384 (inner disk-like member) and 388 (outer disk-like member). Thus in this construction, when the adjustment locking screws 389 are tightened, the inner disk-like member 384, the abutting members or studs 329 and 330, the plug 316, the key 379 and the stem 382 to which the outer disk-like member 388 is secured, are all locked together as a unit by means of the stem 382 and the adjustment locking screws 389 and the key 379. This means that the inner disk-like member 384 and the outer disk-like member 388 are in effect locked to the plug 316 except when the adjustment locking screws 389 are loosened for the purpose of making an adjustment. In this structure, the inner disk-like member 384 is therefore clamped to the plug 316 and they are clamped between locking screws 389 and the key 379. This causes the stem 382 to be in tension between the outer disk-like member (knob) 388 and the key 379.

In Fig. 20 I have shown an alternative arrangement of the inner and outer dials. Therein the inner or larger dial 484 corresponds generally to the dial 384 of Figures 16 and 17 and the outer or smaller dial 488 corresponds generally to the dial 388 of Figures 16 and 17. The screws 489 correspond to the screws 389 and the stem 482 corresponds to the stem 382 of Figs. 16 and 17. The notch 494 in the inner dial 484 serves the same purpose as the pointers 394 and 394a shown on the outer dial 388 in Fig. 17. Thus the outer dial 488 carries not only the notations "lower" and "higher," but also the 10° graduations and cooperates with the notch 494 to show degrees of adjustment between the two dials.

The dials 484 and 488, like the dials 384 and 388, and 84 and 88, are much larger than adjustment dials heretofore used, each having diameters greater than the diameters of the associated plugs (e. g. 16 and 316). Thus it is possible not only to perceive smaller adjustment indications, but also adjustment is easier due to the ability to grasp the dials more easily with the fingers. Calibrations are thus provided on the inner dials 84 and 384 and on the outer dial 488. Thus it is clear that such calibrations may be provided on either or both the inner and/or outer dial.

In Figures 21 and 22 I have shown a further modification in which the dial 584 is smaller in diameter than the dial 588, has sockets for the studs 529 and 530, and has an outwardly extending pointer 594 which is bent over to cooperate with the graduations on the dial 588. The stem 582 extends into a socket in the dial 588 and locking screws 589 are threaded through threaded openings in the dial 588 and bear on the surface of the dial 584. I prefer that said inner disk-like member 584 be smaller than said outer disk-like member 588 in order to provide easier adjustment, but the member 584 could have a diameter equal to that of member 588 or even larger.

It is to be understood that the above described embodiments of my attached invention are for the purpose of illustration only and various changes may be made therein without departing from the spirit and scope of my invention.

I claim:

1. A valve comprising a body member having an annular valve seat at one end and an opening extending therethrough; a stem extending through said opening; means for rotating said stem; a threaded reciprocable valve cooperating with said annular valve seat and formed with projecting ears; means for preventing rotation of said reciprocable valve comprising a thermostatic diaphragm having slots into which said ears extend; means for reciprocating said reciprocable valve comprising a threaded sleeve surrounding the inner end of said stem, having a keyway and in threaded engagement with said reciprocable valve and a key secured to the inner end of said stem and extending into said keyway for rotating said sleeve; and means for connecting said thermostatic diaphragm to said sleeve whereby changes in temperatures act through said thermostatic diaphragm to move said sleeve and said reciprocating valve lengthwise of the body member.

2. A valve comprising a fixed casing body member having a non-rotatable annular valve seat at one end and an opening extending therethrough; a stem extending through said opening; means for rotating said stem; a threaded reciprocable valve cooperating with said annular valve seat; means for preventing rotation of said reciprocable valve; means for reciprocating said reciprocable valve comprising a sleeve on the stem and in threaded engagement with said reciprocable valve and a key formed integrally with the inner end of said stem for rotating said sleeve and a thermostat connected to said sleeve for moving it and said reciprocating valve longitudinally of the body member.

3. A thermostatic control comprising a substantially cylindrical casing having an inlet opening; a threaded reciprocable valve element in said casing arranged to move lengthwise thereof; a valve seat, formed as a shoulder on said casing, on which said reciprocable valve element seats when moved lengthwise of said casing in one direction; means for preventing rotation of said reciprocable valve element; a handle; a stem connected to said handle for rotation thereby; a threaded sleeve slidably but non-rotatably mounted on the end of said stem opposite to said handle and screwed into the threads of said valve element whereby rotation of said stem causes rotation of said sleeve and lengthwise movement of said valve element; a thermostat connected to said sleeve whereby expansion of said thermostat reciprocates said sleeve and thus also moves said reciprocable valve member lengthwise of said casing.

4. A valve comprising a casing having an inlet opening, an outlet opening, a tapered central bore, a spring seat surrounding said bore, and a circular valve seat surrounding said spring seat; a rotatable plug valve snugly fitting in the tapered central bore of said casing, terminating substantially in the plane of said circular valve seat at one end, having a central axial opening extending longitudinally therethrough, and a separated fluid passage formed therein and extending longitudinally for a substantial portion of the length of said axial opening substantially parallel with the axis of said central bore of the casing; a reciprocable valve element movable longitudinally of said valve to and from said seat; a spring seated on the spring seat of said casing and bearing on said reciprocable valve element to urge it from its seat; a handle connected to said plug valve for rotating it from an open position to a closed position and from said closed position to said open position; and a shaft positioned concentrically in and extending through the axial opening, connected to said handle for rotation thereby and connected to said reciprocable valve element for reciprocation thereof to and from said seat.

5. A valve comprising a casing having an inlet opening on one side, an outlet opening at one end, a tapered central bore, an annular recess surrounding and extending coextensively with said bore for a substantial portion of its length and facing said outlet opening, and a circular valve seat surrounding said annular recess; a rotatable plug valve snugly fitting in the tapered central bore of said casing, terminating substantially in the plane of said circular valve seat at its end nearest the outlet opening, having a central axial opening extending longitudinally therethrough, and a separated annular longitudinal passage formed therein facing toward said outlet opening; a reciprocable valve element movable longitudinally of said valve to and from said seat; means for preventing rotation of said valve element; a spring seated in the annular recess of said casing and bearing on said reciprocable valve element to urge it from its seat; a handle connected to plug valve for rotating it from an open position to a closed position and from said closed position to said open position; means for reciprocating said valve element comprising a shaft positioned concentrically in and extending through the axial opening of the plug, and connected to said handle for rotation thereby, a key on the opposite end of said shaft, and a rotatable sleeve member engaged by said key for rotation therewith and formed with a threaded portion operatively connected with said reciprocable valve element whereby rotation of said shaft causes reciprocation of said valve element seat; a main thermostat means connected to said rotatable sleeve member; a compensating thermostat means connected with said main thermostat means and arranged to compensate for impertinent heat affecting said main thermostat means; and means connecting said main thermostat means and said sleeve member for cooperating with said shaft for controlling the position of said sleeve member and said reciprocable valve element lengthwise of said casing.

6. A valve comprising a casing having an inlet opening, an outlet opening, a tapered central bore, a spring seat surrounding said bore, and a circular valve seat surrounding said spring seat; a rotatable plug valve snugly fitting in the tapered central bore of said casing, terminating substantially in the plane of said circular valve seat at one end, having a central axial opening extending longitudinally therethrough, and a separated fluid passage formed therein generally parallel to the axial opening and extending longitudinally substantially coextensively with the axial opening for a substantial portion of its length and extending longitudinally substantially parallel with the axis of said tapered central bore of the casing; a reciprocable valve element movable longitudinally of said valve to and from said seat; a spring seated in the spring seat of said casing and bearing on said reciprocable valve element to urge it from its seat; a handle connected to said plug valve for rotating it from an open position to a closed position and from said closed position to said open position; a shaft positioned concentrically in and extending through the axial opening, connected to said handle for rotation thereby and connected to said reciprocable valve element for reciprocation thereof to and from said seat; a main thermostat means connected with said reciprocable valve member; a compensating thermostat means connected with said main thermostat means and arranged to compensate for impertinent heat affecting said main thermostat means; and means connecting said main thermostat means and said reciprocable valve member for controlling the position of said reciprocable valve member lengthwise of said casing.

7. A valve comprising a casing having an inlet opening on one side, an outlet opening at one end, a tapered central bore, an annular recess surrounding and extending coextensively with said bore for a substantial portion of its length and facing said outlet opening, and a circular valve seat surrounding said annular recess; a rotatable plug valve snugly fitting in the tapered central bore of said casing, terminating substantially in the plane of said circular valve seat at its end nearest the outlet opening, having a central axial opening extending longitudinally therethrough, and a separated annular longitudinal passage formed therein facing toward said outlet opening; a reciprocable valve element movable longitudinally of said valve to and from said seat; means for preventing rotation of said valve element; a spring seated in the annular recess of said casing and bearing on said reciprocable valve element to urge it from its seat; a handle connected to said plug valve for rotating it from an open position to a closed position and from said closed position to said open position; and means for reciprocating said valve element comprising a shaft positioned concentrically in and extending through the axial opening of the plug, and connected to said handle for rotation thereby, a key on the opposite end of said shaft, and a rotatable sleeve member engaged by said key for rotation therewith and formed with a threaded portion operatively connected with said reciprocable valve element whereby rotation of said shaft causes reciprocation of said valve element to and from said seat.

8. A thermostatic control valve having a front and a rear comprising a substantially cylindrical casing having an inlet opening; a reciprocable valve element in said casing arranged to move lengthwise thereof; a valve seat on the said casing on which said reciprocable valve element seats when moved lengthwise of said casing to the front thereof; means for preventing rotation of said reciprocable valve element; a handle; a stem connected to said handle for rotation thereby; a connecting element slidably but not rotatably mounted on the end of said stem opposite to said handle and secured to said valve element so that rotation of said stem causes lengthwise movement of said valve element; and a thermostat connected to said connecting element so that expansion of said thermostat moves said reciprocable valve element lengthwise of said casing.

9. A thermostatic control comprising a substantially cylindrical casing having an inlet opening and an outlet opening, and formed with a central bore, an annular recess surrounding said bore and a circular valve seat surrounding said annular recess; a reciprocable valve element in said casing arranged to move lengthwise thereof to and from said seat; means for preventing rotation of said reciprocable valve element; a spring seated in said annular recess of said casing bearing on said reciprocable valve element; a handle; a shaft connected to said handle for rotation thereby, and connected to said reciprocable valve element for reciprocation thereof to and from said seat; a sleeve slidably but non-rotatably mounted on the end of said shaft opposite to said handle and secured to said valve element so that rotation of said stem causes rotation of said sleeve and lengthwise movement of said valve element; and a thermostat connected to said sleeve whereby expansion of said thermostat reciprocates said sleeve and thus also moves said reciprocable valve member lengthwise in said casing.

10. A thermostatic control comprising a substantially cylindrical casing having an inlet opening, an outlet opening, a tapered central bore, a spring seat recess surrounding said bore and a circular valve seat surrounding said spring seat; a rotatable tapered plug valve snugly fitting in said tapered central bore of said casing, terminating substantially in the plane of said circular valve seat, having a central axial opening extending longitudinally therethrough and a separated fluid passage formed therein generally parallel to the axial opening extending longitudinally substantially coextensively with the axial opening for a substantial portion of its length and extending longitudinally substantially parallel with the axis of said tapered central bore in the casing; a reciprocable valve element in said casing arranged to move lengthwise thereof to and from said seat; means for preventing rotation of said reciprocable valve element; a spring seated on said spring seat of said casing bearing on said reciprocable valve element; a handle connected to said plug valve for rotating it from an open position to a closed position and from said closed position to said open position and connected to said reciprocal valve element for reciprocation thereof; and a thermostat connected to said sleeve whereby expansion of said thermostat reciprocates said sleeve and thus also moves said reciprocable valve member lengthwise in said casing.

11. A thermostatic control valve comprising a casing having an inlet opening, an outlet opening, a central bore, a spring seat surrounding said bore, and a circular valve seat surrounding said spring seat; a threaded reciprocal valve element movable longitudinally of said control to and from said valve seat; a spring seated on the spring seat of said casing and bearing on said reciprocable valve element for urging it away from said seat; manual means for reciprocating said reciprocable valve element comprising a shaft positioned concentrically in and extending through the axial opening, connected to said handle for rotation thereby, a sleeve in threaded engagement with said reciprocable valve element and a key secured to the inner end of said shaft for rotating said sleeve and thermostatic means connected to said sleeve for reciprocating it in response to temperature changes.

12. A thermostatic control valve comprising a casing having an inlet opening, an outlet opening, a tapered central bore, a spring recess separated from said bore and extending coextensively therewith for a substantial portion of its length, and a circular valve seat surrounding said spring recess; a rotatable tapered plug valve snugly fitting in the tapered central bore of said casing, terminating substantially in the plane of said circular valve seat, having a central axial opening extending longitudinally therethrough and a separated longitudinal fluid passage formed therein generally parallel to the axial opening; a reciprocable valve element formed with ears and movable longitudinally of said control to and from said valve seat; a spring seated in the spring recess of said casing and bearing on said reciprocable valve element for urging it away from said seat; a handle connected to said plug valve for rotating it from an open position to a closed position and from said closed position to said open position; and a shaft positioned concentrically in and extending through the axial opening, connected to said handle for rotation thereby and connected to said reciprocable valve element for simultaneously causing reciprocation of said reciprocable valve element towards the seat as said rotatable valve is rotated in one direction; and means comprising a thermostatic diaphragm having slots into which said ears extend for controlling the position of said valve element longitudinally of the control valve in response to heat and for preventing rotation of said reciprocable valve element.

13. A thermostatic control comprising a substantially cylindrical main casing having an inlet opening and formed with a central bore, a spring seat surrounding said bore, and a circular valve seat surrounding said annular recess; an auxiliary casing secured thereto and formed with an outlet opening; an annular U-shaped reciprocable valve element having one leg at times contacting with said valve seat, having the other leg threaded, having an annular recess formed between the legs and serving as a spring recess and said valve element being arranged to move lengthwise in said auxiliary casing to and from contact with said valve seat; a spring seated on the spring seat of said casing, extending into said annular recess, and bearing on said reciprocable valve element for urging said valve element away from said valve seat; a handle; a threaded sleeve connected to said handle for rotation thereby and threaded into the threads of said reciprocable valve element for the reciprocation thereof to and from said valve seat; and means for controlling said reciprocable valve element in response to pertinent heat comprising a thermostatic device, and a connection between said thermostatic device and said reciprocal valve element.

14. A thermostatic control comprising a substantially cylindrical casing having an inlet opening, an outlet opening, a tapered central bore, a spring seat separated from said bore and a circular valve seat surrounding said spring seat; a threaded reciprocal valve element in said casing arranged to move lengthwise thereof to and from said seat; means for preventing rotation of said reciprocable valve element comprising a thermostatically controlled device secured thereto; a spring seated on said spring seat of said casing bearing on said reciprocable valve element; a handle, a shaft connected to said handle for rotation thereby; a threaded sleeve slidably but non-rotatably mounted on the end of said shaft opposite to said handle and secured to said valve element by the cooperating threads of the two parts so that rotation of said stem causes rotation of said sleeve and lengthwise movement of said valve element; a spring supporting unit secured to said sleeve; a spring cap secured to said supporting unit; and a spring under compression held compressed between said supporting unit and said cap, said valve element, thermostatically controlled device, sleeve, supporting unit and cap being a sub-assembled unit removable from said control as a unit and said thermostatically controlled device bearing on said cap and being thus connected to said sleeve whereby expansion of said thermostat reciprocates said sleeve and thus also moves said reciprocable valve member lengthwise in said casing.

15. A thermostatic control valve having a front and a rear comprising a substantially cylindrical casing having an inlet opening; a second casing joined thereto and formed with an outlet opening; a reciprocable valve element in said casing arranged to move lengthwise thereof and arranged when in open position to allow a passage between said inlet and said outlet and when in closed position to close said passage; a fixed valve seat for said reciprocable valve element formed as a shoulder on the said first named casing on which said reciprocable valve element seats when moved lengthwise of said casing toward the front thereof; a spring for urging said valve element away from said seat to an open position; means for preventing rotation of said reciprocable valve element; a handle; a stem connected to said handle for rotation thereby; a connecting element slidably but not rotatably mounted on the end of said stem opposite to said handle and secured to said valve element so that rotation of said stem causes lengthwise movement of said valve element; and thermostatic means for reciprocating said valve element toward said seat in response to pertinent heat comprising a container for liquid, exposed to pertinent heat, a conduit for liquid connected to said container, a pair of diaphragm members arranged in substantially parallel relationship and sealed to each other along their peripheries so as to form a chamber connected to said conduit so as to contain said liquid, one said diaphragm member being made of a material having a relatively high coefficient of thermal expansion and the other diaphragm member being made of a material having a relatively low coefficient of thermal expansion so that impertinent heat causes an increase in the effective size of the chamber, and a liquid having a relatively high coefficient of thermal expansion substantially filling said container, said conduit, and said chamber.

16. A thermostatic control valve having a front and a rear comprising a substantially cylindrical main casing having an inlet opening, and formed with a central bore, a spring seat separated from said bore, and a circular valve seat surrounding said spring seat; an auxiliary casing secured thereto and formed with an outlet opening; a threaded reciprocable valve element in said casing arranged to move lengthwise thereof in said auxiliary casing and to seat on said valve seat when moved lengthwise of said casing to the front thereof; a spring seated in the spring seat of said casing and bearing on said reciprocable valve for urging said valve element away from said seat; means for preventing rotation of said reciprocable valve element; a handle; a stem connected to said handle for rotation thereby; a connecting element slidably but not rotatably mounted on the end of said stem opposite to said handle and secured to said valve element so that rotation of said stem causes lengthwise movement of said valve element; and means for controlling said reciprocable valve element in response to pertinent heat comprising a substantially inflexible chamber, flexible bellows connected therewith, a plate connected with the bellows, a bimetallic element, connections between said plate and said bimetallic element, and connections between said bimetallic element and said reciprocating valve element for reciprocating said valve element towards its seat in response to pertinent heat.

17. A thermostatic control valve having a front and a rear comprising a substantially cylindrical main casing having an inlet opening on one side, a central bore, a spring seat surrounding said bore; a reciprocable valve element arranged to move lengthwise of said casing and arranged when in an open position to allow a passage between said inlet and said outlet and when in a closed position to close said passage; a circular valve seat on the said casing surrounding said spring seat, on which said reciprocable valve element seats when moved lengthwise of said casing toward the front thereof; means for preventing rotation of said reciprocable valve element; a stem connected to said handle for rotation thereby; a connecting element slidably but not rotatably mounted on one end of said stem and secured to said valve element so that rotation of said stem causes lengthwise movement of said valve element; a spring seated on the spring seat of said casing and bearing on said reciprocable valve element for urging said valve element away from said valve seat; a handle connected to the other end of said stem and thus to said reciprocable valve element for reciprocation of said valve element to and from said seat upon rotation of said handle; means for controlling said valve element in response to pertinent heat comprising a thermostatic device resiliently connected to said valve element for reciprocating the valve element towards said seat in response to heat and including an additional thermostatic device for moving said valve element away from said seat in response to impertinent heat to compensate therefor, said means comprising a liquid having a relatively high coefficient of thermal expansion exposed to pertinent heat, a pair of diaphragm members sealed to each other along their peripheries so as to form a chamber to contain said liquid, one said diaphragm member being made of a material having a relatively high coefficient of thermal expansion and the other diaphragm member being made of material having a relatively low coefficient of thermal expansion so that impertinent heat causes an increase in the effective size of said chamber.

18. A thermostatic control valve having a front and a rear comprising a substantially cylindrical casing having an inlet opening and formed with a central bore; a spring seat surrounding said bore, and a circular valve seat surrounding said spring seat; an auxiliary casing secured thereto and formed with an outlet opening; a threaded reciprocable valve element arranged to move lengthwise in said auxiliary casing; a spring seated on the spring seat of said casing and bearing on said reciprocable valve element for urging said valve element away from said valve seat; means for preventing rotation of said reciprocable valve element; a handle; a shaft positioned concentrically in and extending through said central bore, connected to said handle for rotation thereby; a connecting element slidably but not rotatably mounted on the end of said shaft opposite to said handle and secured to said valve element so that rotation of said shaft causes lengthwise movement of said valve element; and means for controlling said reciprocable valve element in response to pertinent heat comprising a substantially inflexible chamber, flexible bellows associated therewith, a plate associated with the bellows, a bimetallic element, connections between said plate and said bimetallic element, and connections between said bimetallic element and said reciprocating valve element for reciprocating said valve element towards its seat in response to pertinent heat.

19. A valve comprising a body member having an inlet port and formed with an axial opening; a rotor member having an inner end and an outer end, having an inlet port at times registering with said inlet port in the body, having a central bore extending axially and longitudinally therethrough, and also having a passageway for fluid from said inlet; a thermostatic valve adjacent to the inner end of said body for controlling the passage of fluid; an adjustment device comprising an adjustment stem for adjusting said thermostatic valve extending through said central bore, an outer member secured to the forward end of said stem for turning said stem relative to said rotor member when adjusting said thermostatic valve, and an inner member not revolvable relative to said rotor member cooperating with said outer member; means normally urging said outer member and said inner member apart and thus locking said stem against rotation relative to said inner member and said rotor member; and means for turning said rotor member together with said locked stem for normal operation of said thermostatic valve simultaneously with said rotor member and the inlet port thereof; said inner member being disk-like in shape and being formed with indicia and said outer member being smaller than said inner member and being also formed with indicia cooperating with the indicia of the inner member.

20. A valve having a fluid chamber formed with an outlet and comprising a body member having an inlet port and formed with an axial opening; a rotor member having an inlet port at times registering with said inlet port in the body for allowing the flow of fluid at such times from said inlet ports to said fluid chamber, and having a central bore extending axially and longitudinally therethrough; a thermostatic valve in said fluid chamber for controlling the flow of fluid from said inlet ports to said fluid chamber; an adjustment stem positioned within said central bore of said rotor member, connected to said thermostatic valve for the purpose of adjusting it, having a forward outer end and a rearward inner end, and normally locked against rotation relative to said rotor member; a first internal locking means comprising an abutting means carried by said adjustment stem, positioned adjacent to the inner end of said adjustment stem and normally abutting forwardly against said rotor member for normally locking said stem against rotation relative to said rotor member; a second locking means comprising a member containing indicia, secured to the stem adjacent to the forward outer end for use when adjusting said thermostatic valve; a third locking means carried by said indicia member, positioned eccentric of the stem, urging said rotor member inwardly toward said abutting means, and also used when normally locking said stem to said rotor member, said three locking means cooperating to cause said adjustment stem to be normally under tension effectively between said abutting means and said member containing indicia; and an inner indicia element larger than the indicia member of the second locking means and being itself formed with indicia which cooperates with the indicia of said locking means indicia member and being secured to the rotor member to revolve therewith.

21. A valve comprising a body member formed with a tapered axial opening and having an inlet port and an outlet opening, and a rotatable tapered plug positioned in said tapered axial opening, having a central opening extending axially and longitudinally therethrough for the reception of a shaft, having an annular recess extending inward from the smaller end thereof surrounding but spaced from said central opening for the passage of fluid therethrough to said outlet opening, and having a plurality of ports leading into said annular recess from the periphery of said plug adjacent to the longitudinal center thereof, a portion of said plug which is aligned with the inlet port having segmental depressions which leave in a plane normal to the axis of the valve and passing through said inlet port a solid arcual portion on one side for closing off the flow of fluid from said body inlet port to said outlet opening and which leave in said plane a solid triangular strengthgiving portion on the opposite side, said strengthgiving portion being substantially less in width than the width of the inlet port of the body member, the triangular strengthgiving portion thus not being of sufficient width to close off thereby the flow of fluid from said inlet port.

22. A valve having a fluid chamber formed with an outlet comprising a body member having an inlet port and formed with an axial opening; a rotor member having an inlet port at times registering with said inlet port in the body for allowing the flow of fluid to said chamber and having a central bore extending axially and longitudinally therethrough; a thermostatic valve in said fluid chamber for controlling the flow of fluid; an adjustment stem for adjusting said thermostatic valve, said stem being positioned in said central bore of said rotor member and being normally locked against rotation relative to said rotor member; a forwardly abutting locking means carried by said adjustment stem bearing forwardly against said rotor member, and used when normally locking said stem against rotation relative to said rotor member, a second locking means comprising a member containing indicia secured to the stem adjacent to the forward end thereof, for use when adjusting said thermostatic valve; a third locking means carried by said indicia member, positioned eccentric of the stem, bearing rearwardly against said rotor member, and used when normally locking said stem and said indicia member against rotation relative to said rotor member; said three locking means combining to cause said adjustment stem to be normally under tension between said abutting means and said indicia member; said indicia member and said stem being rotatable at times with regard to said rotor to adjust said thermostatic valve relative to said rotor member; and means for turning said rotor member together with said stem for normal operation of said thermostatic valve together with normal operation of said rotor member and the inlet port thereof in which an inner indicia element is secured to the rotor member to revolve therewith, said inner indicia element being larger than the indicia member of the second locking means and being itself formed with indicia which cooperates with the indicia of said locking means indicia member.

23. A valve having an inner end and an outer end and comprising a body formed with an inwardly tapered opening extending longitudinally therein, having its inner end open, and having an inlet port extending through a side wall thereof; a closure for said inner open end of said body member, said closure member having an outlet; a tapered plug having an inner relatively small end and an outer larger end fitting in said tapered opening, having a central axial opening extending therethrough, and having a passageway through which fluid at times flows toward and issues from the inner end of said plug into said closure member, which passageway is adapted at times to register with and be connected with said inlet port; a separate thermostatically controlled valve; a stem having an inner end and an outer end, extending through said axial opening, and rotatable at times relative to said plug for the adjustment of said thermostatically controlled valve; an abutting element secured to the stem adjacent to the inner end of said stem and abutting against said plug; an outer member secured to said stem adjacent to the outer end thereof; a bearing element supported by said plug adjacent to the outer end thereof and positioned inward of said outer member; and means connected to said outer member and to said bearing element for urging said outer member and said bearing element apart whereby said outer member is normally anchored to said plug; said bearing element being disk-like in shape, being secured to said plug to revolve therewith, and being formed with indicia, and said outer member being smaller than said disk-like bearing element and being also formed with indicia cooperating with the indicia of said bearing element.

24. A valve comprising a body member having a front end and a rear end, formed with a tapered opening extending longitudinally therein, and having an inlet port extending through a side wall thereof; a closure for the rear end of said body member having an outlet port; a tapered plug positioned in said opening, having a central opening extending longitudinally therethrough, having a passageway through which fluid at times flows into said closure and having an inlet port in a side wall thereof connected to said passageway and at times registering with said inlet port of the body; a separate thermostatically controlled valve for at times separating said passageway from said closure; a stem having an inner rear end and an outer front end extending through said axial opening, and rotatable at times relative to said plug for the adjustment of the thermostatically controlled valve; an abutting element secured to said stem adjacent to the inner end thereof and abutting against said plug; means for adjusting said thermostatically controlled valve comprising a dial element formed with an eccentric threaded opening, provided with a pointer and secured to said stem adjacent to the outer end thereof; a second dial element supported by said plug; means comprising a screw threaded through said eccentric opening and bearing on said second dial element for urging said dial elements apart whereby said adjusting mechanism is through said stem normally anchored to said plug.

25. A valve having a front end and a rear end and comprising a body member, formed with a tapered opening extending longitudinally therein and having an inlet port extending through a side wall thereof; a closure for the rear end of said body member and having an outlet port; a tapered plug having a relatively large front end and a relatively small rear end, fitting in said tapered opening, having a central axial opening extending through said plug, and having a passageway through which fluid at times flows toward and issues from said rear end; a separate thermostatically controlled valve; a stem having a front end and a rear end extending through said axial opening, and rotatable at times relative to said plug for the adjustment of said thermostatically controlled valve; an abutting element secured to said stem adjacent to the inner end thereof and abutting against said plug; an adjustment member secured to the said stem adjacent to the front end thereof; a second member supported by and abutting rearwardly against said plug, one of said members being provided with graduations with which the other cooperates to show the amount of any adjustment of the thermostatically controlled valve; and means secured to one of said members and bearing on the other said member to spread said members apart whereby said members are anchored to said plug.

26. A valve comprising a body member formed with an inlet and an outlet and with a tapered opening extending therein; a tapered plug fitting in said opening, having an axial opening extending therethrough, and having a fluid passageway at times connected to said inlet and to said outlet; a theromstatic valve; a stem extending through said axial opening, and rotatable at times relative to said plug to adjust said thermostatic valve; an abutting element secured to said stem adjacent to the inner end thereof and abutting against said plug; an outer member supported by the stem adjacent to its outer end; an inner member supported by said plug; and a locking means bearing on both said outer member and said inner member to spread them apart whereby both said inner member and said outer member are anchored to said plug, said inner member being disk-like in shape and being secured to said plug to revolve therewith, and being formed with indicia, and said outer member being smaller than said inner member and being also formed with indicia cooperating with the indicia of the inner member.

27. A valve comprising a body member having an inlet port and an outlet port and formed with a tapered opening extending therein; a tapered plug fitting in said opening and having a central axial opening extending therethrough; a stem extending concentrically through said axial opening; a member fastened to one end of said stem and having a graduated scale marked thereon; a plurality of studs positioned eccentrically of the axis of said plug secured in the larger end thereof; a second member formed with eccentric openings through which said studs extend; and means for adjustably connecting said first member to said studs comprising a third member having eccentric openings through which the heads of said studs extend, and a pair of screws threaded into said first member and bearing on said third member.

28. A valve comprising a body member formed with an inlet port and an outlet port and formed with a tapered opening extending therein; a tapered plug fitting in said opening and having a central axial opening extending therethrough; a stem extending concentrically through said axial opening; a stamping having a graduated scale marked thereon secured to one end of said stem; a pair of studs positioned eccentrically of the axis of said plug secured in the larger end thereof; a second stamping formed with eccentric openings through which said studs extend; and means for adjustably securing said first stamping to said studs comprising a third stamping having eccentric openings through which the heads of said studs extend, and a nut threaded onto one end of said stem for securing said first stamping thereto and for forcing the periphery of said first stamping into firm frictional engagement with said third stamping.

29. A valve comprising a body member having an inlet port and formed with a tapered axial portion; a tapered plug having a larger outer end and a smaller inner end positioned in said tapered portion, having an inlet at times registering with said body inlet port, having a central bore extending axially and longitudinally therethrough, and also having a fluid passage extending from said inlet to the inner smaller end of said plug; a thermostatic valve; an adjustment device comprising an adjustment stem for adjusting said thermostatic valve extending through said central bore, an outer member secured to the forward end of said stem for revolving said stem relative to said plug, and an inner member non-revolvable relative to the plug cooperating with said outer member; means normally urging said outer member and said inner member apart and thus locking said stem and said outer member against rotation relative to said inner member and said plug; and means for turning said plug valve together with said locked stem for normal operation of said thermostatic valve simultaneously with said plug valve; said inner member being disk-like in shape and being formed with indicia and said outer member being smaller than said inner member and being also formed with indicia cooperating with the indicia of the inner member.

30. A valve having an inner end and an outer end and comprising a body formed with an inwardly tapered opening extending longitudinally therein having an inner end open, and having an inlet port extending through a side wall thereof; a fluid chamber adjacent said inner open end of said body member, said fluid chamber having an outlet; a tapered plug having an inner relatively small end and an outer larger end fitting in said tapered opening, having a central axial opening extending therethrough, and having a passageway through which fluid at times flows toward and issues from the inner end of said plug into said fluid chamber, which passageway is adapted at times to register with and be connected with said inlet port; a separate thermostatically controlled valve; a stem having an inner end and an outer end, extending through said axial opening, and rotatable at times relative to said plug for the adjustment of said thermostatically controlled valve; an abutting element secured to the stem adjacent to the inner end of said stem and abutting outwardly against said plug; a member secured to said stem adjacent to the outer end thereof; a bearing element supported by said plug adjacent to the outer end thereof and positioned inward of said member; and means connected to said member and to said bearing element for urging said member and said bearing element apart whereby said member is normally anchored to said plug, said bearing element being disk-like in shape, being secured to said plug to revolve therewith, and being formed with indicia, and said outer member being smaller than said bearing element and being also formed with indicia cooperating with the indicia of the bearing element.

References Cited in the file of this patent

UNITED STATES PATENTS

| | | |
|---|---|---|
| 261,068 | Thorey | July 11, 1882 |
| 953,067 | Stark | Mar. 29, 1910 |
| 1,139,162 | Chapman | May 11, 1915 |
| 1,145,271 | Scanlan | July 6, 1915 |
| 1,387,073 | Reilly | Aug. 9, 1921 |
| 2,303,011 | Weber et al. | Nov. 24, 1942 |
| 2,328,642 | Green | Sept. 7, 1943 |

FOREIGN PATENTS

| | | |
|---|---|---|
| 5,008 | Great Britain | of 1906 |

UNITED STATES PATENT OFFICE

CERTIFICATE OF CORRECTION

Patent No. 2,801,800                                           August 6, 1957

Isaac Vernon Brumbaugh

It is hereby certified that error appears in the printed specification of the above numbered patent requiring correction and that the said Letters Patent should read as corrected below.

Column 14, line 72, before "plug" insert -- said --; column 22, line 53, for "theromstatic valve" read -- thermostatic valve --.

Signed and sealed this 12th day of November 1957.

(SEAL)
Attest:

KARL H. AXLINE                                          ROBERT C. WATSON
Attesting Officer                                    Commissioner of Patents